United States Patent
Ahmad (10) Patent No.: US 9,824,076 B2
(45) Date of Patent: Nov. 21, 2017

(54) BIG FILE EDITOR (71) Applicant: BANK OF AMERICA CORPORATION, Charlotte, NC (US)

(72) Inventor: Shadabuddin Ahmad, Hyderabad (IN)

(73) Assignee: BANK OF AMERICA COPORATION, Charlotte, NC (US)

( * ) Notice: Subject to any disclaimer, the term of this patent is extended or adjusted under 35 U.S.C. 154(b) by 351 days.

(21) Appl. No.: 14/514,060

(22) Filed: Oct. 14, 2014

(65) Prior Publication Data

US 2016/0103809 A1 Apr. 14, 2016

(51) Int. Cl.
*G06F 17/24* (2006.01)
*G06F 17/22* (2006.01)

(52) U.S. Cl.
CPC .......... *G06F 17/24* (2013.01); *G06F 17/2211* (2013.01); *G06F 17/2229* (2013.01)

(58) Field of Classification Search
CPC .............................. G06F 17/24; G06F 3/04842
See application file for complete search history.

(56) References Cited

U.S. PATENT DOCUMENTS

| | | | | |
|---|---|---|---|---|
| 6,262,729 B1* | 7/2001 | Marcos | ..................... | G06F 8/20 715/744 |
| 2003/0152277 A1* | 8/2003 | Hall, Jr. | ............. | G06K 9/00463 382/229 |
| 2005/0289111 A1* | 12/2005 | Tribble | ............. | G06F 17/30038 |
| 2006/0195431 A1* | 8/2006 | Holzgrafe | ......... | G06F 17/30011 |
| 2007/0124295 A1* | 5/2007 | Forman | .................. | G06F 17/211 |
| 2008/0294427 A1* | 11/2008 | Cheng | .................. | G06F 17/2785 704/9 |
| 2009/0132472 A1* | 5/2009 | Masuda | ............ | G06F 17/30106 |
| 2010/0235793 A1* | 9/2010 | Ording | .................. | G06F 1/1626 715/863 |
| 2010/0238471 A1* | 9/2010 | Sakiyama | ............. | G06F 3/1206 358/1.9 |
| 2011/0149350 A1* | 6/2011 | Matsuda | ............. | G06F 17/2241 358/462 |

(Continued)

OTHER PUBLICATIONS

Word 2013—text basic, May 4, 2013 pp. 1-7 http://www.gcflearnfree.org/word2013/text-basics/3/.*

(Continued)

*Primary Examiner* — Scott Baderman
*Assistant Examiner* — Mario M Velez-Lopez
(74) *Attorney, Agent, or Firm* — Michael A. Springs; Moore & Van Allen PLLC; Anup Shrinivasan (57) ABSTRACT

Embodiments of the invention are directed to systems, methods, and computer program products to enable a user to edit a large text file. In some embodiments, the system is configured to receive a first input from a user, wherein the first input comprises selecting a large text file from an external source; receive a second input from the user, wherein the second input comprises a start line and an end line; retrieve the section of the selected large text file defined by the start line and the end line from the external source and load the retrieved section onto a temporary memory location; initiate presentation of the retrieved section of the selected large text file to the user; and enable the user to edit and save at least a portion of the retrieved section of the selected large text file.

16 Claims, 6 Drawing Sheets

(56) References Cited

U.S. PATENT DOCUMENTS

| | | | | |
|---|---|---|---|---|
| 2012/0023447 A1* | 1/2012 | Hoshino | ............. | G06F 17/2735 |
| | | | | 715/823 |
| 2012/0042231 A1* | 2/2012 | Fontes | .............. | G06F 17/30864 |
| | | | | 715/205 |
| 2013/0097490 A1* | 4/2013 | Kotler | ..................... | G06F 17/21 |
| | | | | 715/255 |
| 2013/0198521 A1* | 8/2013 | Wu | ..................... | G06F 21/6209 |
| | | | | 713/175 |
| 2015/0135103 A1* | 5/2015 | Liu | ....................... | G06F 3/0481 |
| | | | | 715/765 |
| 2015/0193510 A1* | 7/2015 | Raess | ................ | G06F 17/30554 |
| | | | | 707/727 |
| 2016/0364299 A1* | 12/2016 | Pidduck | .............. | G06F 11/1451 |

OTHER PUBLICATIONS

Stackoverflow, Jan. 6, 2010 pp. 1-5 http://stackoverflow.com/questions/2016894/how-to-split-a-large-text-file-into-smaller-files-with-equal-number-of-lines.*

PDFMate.com, Combine multiple files, Aug. 6, 2013: pp. 1-3, https://web.archive.org/web/20130806161510/http://pdfmate.com/how-to-combine-join-multiple-pdf-files-free.html.*

Smallseotools.com, text comparison, Jan. 9, 2014: pp. 1-4, http://smallseotools.com/comparison-search/.*

Grovypost (https://www.groovypost.com/howto/5-groovy-things-about-notepad-exe/), as available Dec. 6, 2010.*

Webformix (http://www.webformix.com/whats-file-size-internet-bandwidth/), as available Apr. 24, 2014. pp. 1-7.*

\* cited by examiner

FIGURE 6

BIG FILE EDITOR

FIELD

In general, embodiments of the invention relate to a text editor, in particular, embodiments of the invention relate to a text editor capable of processing large plain text files.

BACKGROUND

A text editor is a program that allows a user to open, view, and edit plain text files. Unlike a word processor, a text editor does not add any formatting to the text, instead focusing on editing functions for plain text. Text editors may be small and simple, while others offer a broad range of complex functions. Simpler text editors may just read files into the computer's main memory. With larger files, this may just read files into the computer's main memory. With larger files, this may be a slow process, and the entire file may not fit. Some text editors do not let the user start editing until this read-in is complete.

There is a need for a simple text editor capable of processing a large text file without the need for additional main memory.

BRIEF SUMMARY

Embodiments of the present invention address the above needs and/or achieve other advantages by providing apparatuses (e.g., a system, computer program product, and/or other device) and methods to enable a user to edit a large text file. The present invention enables the user to edit a large text file without loading the entire large text file into the computer's main memory. The user may select a portion of the large text file to be loaded into the computer's main memory to enable faster processing and editing time.

In some embodiments, an apparatus to enable a user to edit a large text file is presented. The system comprises a computing platform including one or more computing processors, a memory in communication with the processor; a module stored in a memory, executable by a processor and configured to initiate a presentation of a first user interface to receive a first input from a user, wherein the first input comprises selecting a large text file from an external source; receive a second input from the user, wherein the second input comprises a start line and an end line, wherein the start line and the end line define at least a section of the selected large text file; retrieve the section of the selected large text file defined by the start line and the end line from the external source; load the retrieved section of the selected large text file from the external source to a temporary memory location; initiate presentation of the retrieved section of the selected large text file to the user; enable the user to edit at least a portion of the retrieved section of the selected large text file; and enable the user to save changes made to the retrieved section of the selected large text file.

In some embodiments, the first user interface comprises a search field, wherein the search field enables the user to identify a match between a search string input by the user and a search string in the selected large text file based on at least one of a letter case, a first occurrence, or matching a whole word.

In some embodiments, finding a search string based on a first occurrence further comprises identifying a first instance of the search string in the selected large text file.

In some embodiments, the first user interface comprises a recommended batch size based on at least a network bandwidth, wherein the batch size indicates a recommended number of rows associated with the large text file capable of being processed per second.

In some embodiments, the first user interface enables the user to split the selected large text file into a plurality of predetermined equal portions.

In some embodiments, the first user interface enables the user to merge one or more large text files.

In some embodiments, the module is further configured to receive a user selection of a portion of a first large text file from an external source based on at least a first start line and a first end line, wherein the portion of the first large text file comprises a plurality of rows; receive a user selection of a portion of a second large text file from an external source based on at least a second start line and a second end line, wherein the portion of the first large text file comprises a plurality of rows; and compare the portion of the first large text file with the portion of the second large text file, wherein comparing further comprises comparing each of the plurality of rows associated with the portion of the first large text file with each of the plurality of rows associated with the portion of the second large text file to determine one or more unmatched rows.

In some embodiments, comparing further comprises determining a plurality of extra rows in the selected portion of the first large text file and a plurality of extra rows in the selected portion of the second large text file, wherein determining the plurality of extra rows in the selected portion of the first large text file comprises determining a difference between the plurality of rows associated with the selected portion of the first large text file and one or more determined unmatched rows, wherein determining the plurality of extra rows in the selected portion of the second large text file comprises determining a difference between the plurality of rows associated with the selected portion of second large text file and one or more determined unmatched rows.

In one aspect, a method to enable a user to edit a large text file is presented. The method comprises receiving, using a computing device processor, a first input from a user, wherein the first input comprises selecting a large text file from an external source; receiving, using a computing device processor, a second input from the user, wherein the second input comprises a start line and an end line, wherein the start line and the end line define at least a section of the selected large text file; retrieving, using a computing device processor, the section of the selected large text file defined by the start line and the end line from the external source; loading, using a computing device processor, the retrieved section of the selected large text file from the external source to a temporary memory location; initiating, using a computing device processor, presentation of the retrieved section of the selected large text file to the user; enabling, using a computing device processor, the user to edit at least a portion of the retrieved section of the selected large text file; and enabling, using a computing device processor, the user to save changes made to the retrieved section of the selected large text file.

In another aspect, a computer program product to enable a user to edit a large text file is presented. The computer program product comprises a non-transitory computer-readable medium comprising code causing a first apparatus to receive a first input from a user, wherein the first input comprises selecting a large text file from an external source; receive a second input from the user, wherein the second input comprises a start line and an end line, wherein the start line and the end line define at least a section of the selected large text file; retrieve the section of the selected large text file defined by the start line and the end line from the external source; load the retrieved section of the selected large text file from the external source to a temporary memory location; initiate presentation of the retrieved section of the selected large text file to the user; enable the user to edit at least a portion of the retrieved section of the selected large text file; and enable the user to save changes made to the retrieved section of the selected large text file.

BRIEF DESCRIPTION OF THE DRAWINGS

Having thus described embodiments of the invention in general terms, reference will be made to the accompanying drawings, where:

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As used herein, a "line" may refer to a row of plain text in the selected text file. For purposes of the invention, a "line" and a "row" may be used interchangeably.

Data management in a business environment is an administrative process by which information associated with the business is acquired, validated, stored, protected, and processed. Typically, information associated with the business includes primary data and secondary data. Primary data may be original data that has been collected for a specific purpose (e.g., customer information) and secondary data refers to data gathered in the past or obtained from a third party (e.g. research reports, organizational records, government statistics, etc.). Keeping information accurate and up to date is vital to a business. In a business environment, data management is geared toward resolving customer requirements and issues while enhancing customer retention and satisfaction, allowing a business to convert customer data into customer intelligence. It is imperative that the information gathered is integrated across the departments of an organization, including information technology, sales, and human resources. In this regard, when there is a discrepancy in customer data, businesses enable an employee to edit the information to establish synchrony. Typically, customer data is stored by the business in plain text, capable of being read as textual material without much processing. The purpose of using plain text is primarily independence from programs that require individual encoding or formatting, and from computer architecture issues such as byte order, etc. Plain text files can be opened, read, and edited with countless generic text editors and utilities.

Figure 1:
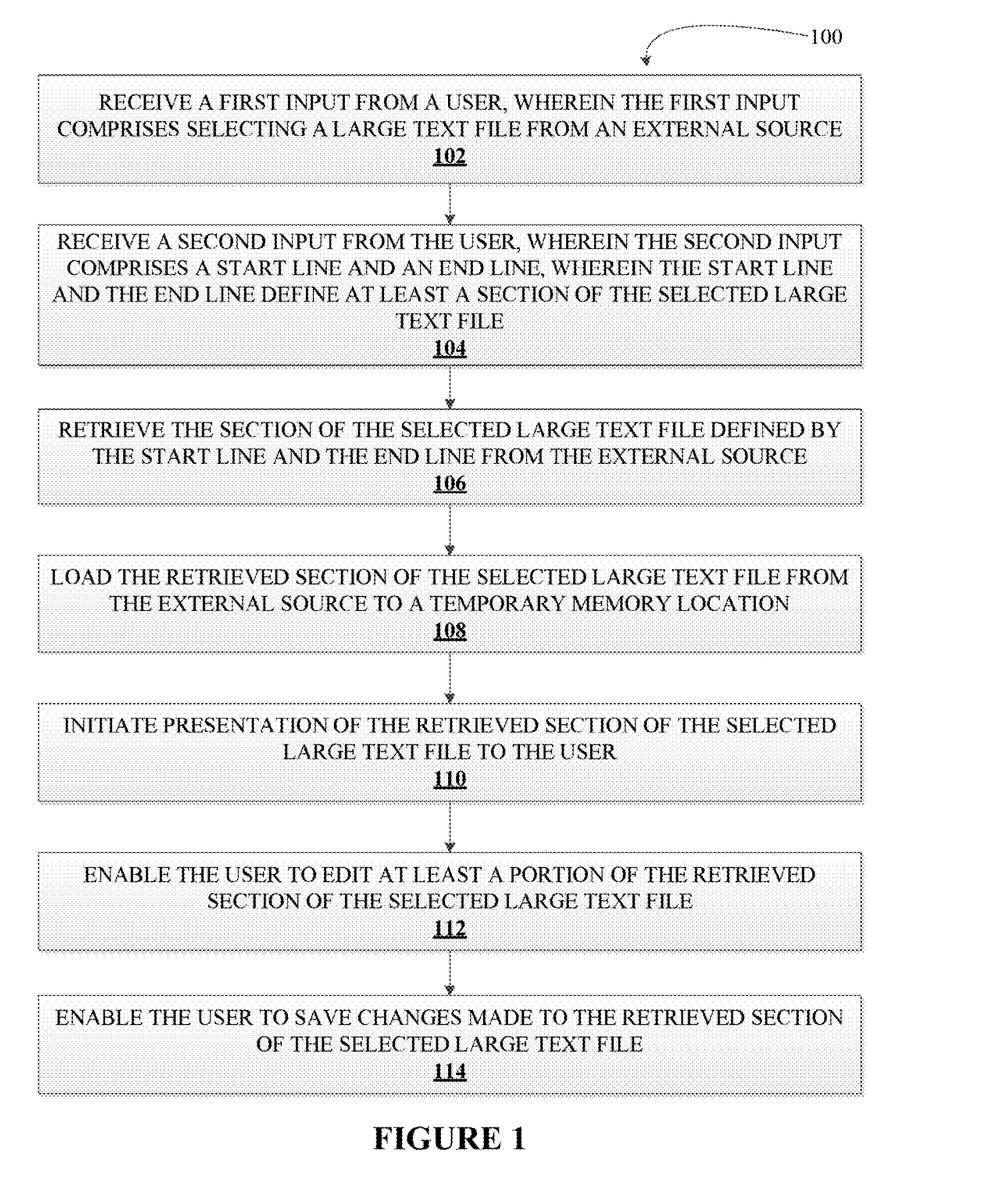
FIG. 1 presents a process flow to enable a user to edit a large text file according to one aspect of the present invention.

FIG. 1 illustrates a high level process flow to enable a user to edit a large text file 100 in accordance with an embodiment of the invention. As shown in block 102, the system may be configured to receive a first unit input from a user, wherein the first input comprises selecting a large text file from an external source. In some embodiments, the external source may be an external database. In some other embodiments, the external source may be a product of an automated software processes. In yet another embodiment, the external source may include log files generated by running software applications. Typically, a large text file may be any text document that supports standard ASCII characters, including numbers, symbols, and spaces, but does not support any type of text formatting. Because plain text does not contain information about text sizes, or styles, it is the most efficient way to store text. Plain text documents often take up less than half the size of rich text documents containing the same number of characters. In most cases, a "log" of data generated by a program is typically stored in plain text format. In some embodiments, selecting a large text file may include loading the large text file on the computer's main memory. Typically, a main memory refers to a physical memory that is internal to the computer, different from external mass storage devices such as disk drives. The computer can manipulate only data that is in the main memory. In this regard, every file accessed from the external storage device is initially copied into the main memory.

In addition, the system may be configured to receive a second input from the user, wherein the second input comprises a start line and an end line, wherein the start line and the end line define at least a section of the selected large text file, as shown in block 104. In response, the system may be configured to retrieve a section of the selected large text file defined by the start line and the end line from the external source, as shown in block 106. Once the section of the selected large text file is retrieved, the system may be configured to load the retrieved section of the selected large text file from the external source to a temporary memory location, as shown in block 108. Typically, text editors have a limit on the size of the text file capable of being loaded into the main memory to be accessed. In some embodiments, the temporary memory location may be the main memory of the computer. In one aspect, the main memory may include random access memory (RAM). Typically, in a random access memory, data byes may be accessed at random, i.e., a byte of memory may be accessed without touching the preceding bytes. For example, a RAM with 8 megabytes (MB) RAM has approximately 8 million bytes of memory that programs can use.

In some embodiments, by selecting a portion of the large text file to be loaded into the temporary memory location, the system may be configured to enable the user to open and edit specific portions of the large text file. In this regard, instead of loading the entire large text file into the main memory, the system may be configured to load only the portion of the large text file defined by the start line and the end line, thereby enabling the user to edit a text file of any size successfully. For example, if the large text file includes 600,000 rows or lines, the system may be configured to enable the user to open a specific portion of the large text file, say between start line 5000 and end line 7240 (2240 rows).

In response to loading the section of the selected large text file, the system may be configured to initiate presentation of the retrieved section to the user, as shown in block 110. Once the selected portion of the large text file is presented to the user, the system may be configured to enable the user to edit at least a portion of the retrieved section of the selected large text file, as shown in block 112. In addition, the system may be configured to enable the user to save changes made to the retrieved section of the selected large text file, as shown in block 114.

In some embodiments, the first user interface may include a recommended batch size. In one aspect, a batch size may refer to a specific number of rows in the large text file capable of being processed per second based on the current network bandwidth. In some embodiments, processing a large text file may include any action associated with the contents of the text file (e.g., plain text) such as transmitting, saving, or the like. For example, a recommended batch size of "2500 rows for 1 MB/second saving" may indicate that the system executing the instructions is capable of processing 2500 rows of plain text in a 1 MB/second network bandwidth. Typically, the recommended batch size is based on at least an amount of memory used to process each character in the large text file, a total number of rows selected by the user to be processed, and/or an average number of characters in each row. For example, a selected portion of the large text file includes 400 rows, with an average number of characters in each row being 120. If each character requires 1 byte of memory (including 1 byte for each space between the words), then each row will require 0.00012 MB of memory to be processed. Assuming the network bandwidth associated with the system is 1 MB/s, the system may be capable of processing a total of 8333 rows, thereby making 8333 rows for 1 MB/second saving its recommended batch size. In some embodiments, the user may have prior knowledge that the network bandwidth, typically greater than 1 MB/s. In such cases, the user may use the recommended batch size to determine the actual batch size. For example, if the user knows that the network bandwidth of the system is 5 MB/s, then the user may calculate the batch size for the system, in this case, 41665, and enter the value in the batch size field available in the first user interface.

In some embodiments, the system may be configured to enable the user to search for a text string in the portion of the selected large text file to identify a section of the large text file for processing. In this regard, the system may be configured to enable a user to search for a text string in the large text file based on at least a letter case, matching a whole word, and/or a first occurrence. Typically, searching based on first occurrence includes determining the first instance of a match between the search text string input by the user and a matching text string in the portion of the selected large text file. The user may then use the matched search string as a reference to begin processing the large text file. In one aspect, the system may be configured to match at least a portion of the search text string with a text string in the portion of the selected large text file.

In some embodiments, the system may be configured to split a large text file into one or more equal text files. In this regard, the system may be configured to enable the user to choose a number of parts to split the large text file. In another embodiment, the system may be configured to merge two or more large text files into a single large text files. In this regard, the system may be configured to enable the user to choose the two or more files to be merged from an external source.

Figure 2:
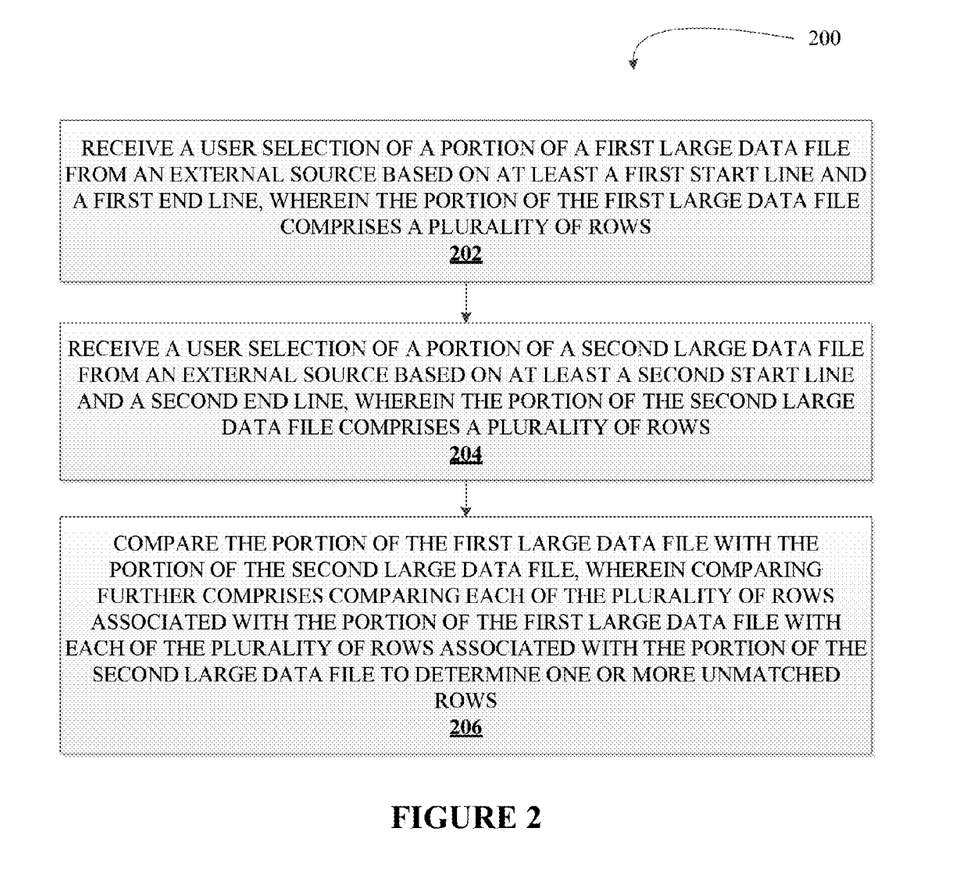
FIG. 2 presents a process flow to enable a user to compare selected portions of two or more large text files according to one aspect of the present invention.

FIG. 2 presents a high level process flow to enable a user to compare selected portions of two or more large text files according to one aspect of the present invention. In this regard, the process flow includes receiving a user selection of a portion of a first large data file from an external source based on at least a first start line and a first end line, wherein the portion of the first large data file comprises a plurality of rows, as shown in block 202. In addition, the system may be configured to receive a user selection of a portion of a second large data file from an external source based on at least a second start line and a second end line, wherein the portion of the second large data file comprises a plurality of rows, as shown in block 204. In response, the system may be configured to compare the portion of the first large data file with the portion of the second large data file, wherein comparing further comprises comparing each of the plurality of rows associated with the portion of the first large data file with each of the plurality of rows associated with the portion of the second large data file to determine one or more unmatched rows, as shown in block 206.

Figure 3:
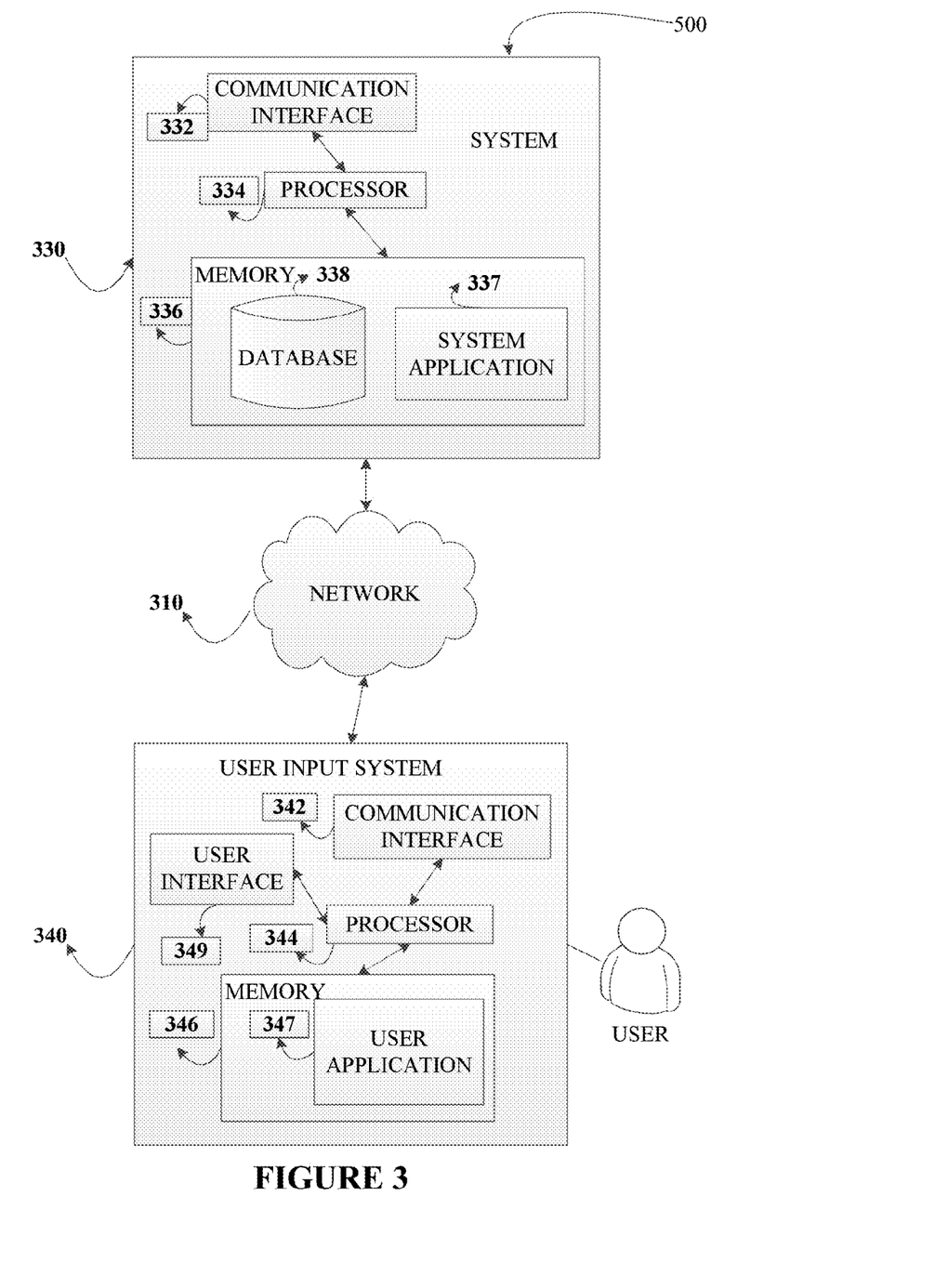
FIG. 3 presents a system environment for enabling a user to edit a large text file according to one aspect of the present invention.

FIG. 3 presents an exemplary block diagram of the system environment 300 for implementing the process flows described herein in accordance with embodiments of the present invention. As illustrated, the system environment 300 includes a network 310, a system 330, and a user input system 340. Also shown in FIG. 3 is a user of the user input system 340. The user input system 340 may be a mobile device or other non-mobile computing device. The user may be a person who uses the user input system 340 to execute a user application 347. The user application 347 may be an application to communicate with the system 330, perform a transaction, input information onto a user interface presented on the user input system 340, or the like. The user application 347 and/or the system application 337 may incorporate one or more parts of any process flow described herein.

As shown in FIG. 3, the system 330, and the user input system 340 are each operatively and selectively connected to the network 310, which may include one or more separate networks. In addition, the network 310 may include a telecommunication network, local area network (LAN), a wide area network (WAN), and/or a global area network (GAN), such as the Internet. It will also be understood that the network 310 may be secure and/or unsecure and may also include wireless and/or wired and/or optical interconnection technology.

The user input system 340 may include any computerized apparatus that can be configured to perform any one or more of the functions of the user input system 340 described and/or contemplated herein. For example, the user may use the user input system 340 to transmit and/or receive information or commands to and from the system 330. In some embodiments, for example, the user input system 340 may include a personal computer system (e.g. a non-mobile or non-portable computing system, or the like), a mobile computing device, a personal digital assistant, a mobile phone, a tablet computing device, a network device, and/or the like. As illustrated in FIG. 3, in accordance with some embodiments of the present invention, the user input system 340 includes a communication interface 342, a processor 344, a memory 346 having an user application 347 stored therein, and a user interface 349. In such embodiments, the communication interface 342 is operatively and selectively connected to the processor 344, which is operatively and selectively connected to the user interface 349 and the memory 346. In some embodiments, the user may use the user application 347 to execute processes described with respect to the process flows described herein. Specifically, the user application 347 executes the process flows described herein.

Each communication interface described herein, including the communication interface 342, generally includes hardware, and, in some instances, software, that enables the user input system 340, to transport, send, receive, and/or otherwise communicate information to and/or from the communication interface of one or more other systems on the network 310. For example, the communication interface 342 of the user input system 340 may include a wireless transceiver, modem, server, electrical connection, and/or other electronic device that operatively connects the user input system 340 to another system such as the system 330. The wireless transceiver may include a radio circuit to enable wireless transmission and reception of information. Additionally, the user input system 340 may include a positioning system. The positioning system (e.g. a global positioning system (GPS), a network address (IP address) positioning system, a positioning system based on the nearest cell tower location, or the like) may enable at least the user input system 340 or an external server or computing device in communication with the user input system 340 to determine the location (e.g. location coordinates) of the user input system 340.

Each processor described herein, including the processor 344, generally includes circuitry for implementing the audio, visual, and/or logic functions of the user input system 340. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 347 of the memory 346 of the user input system 340.

Each memory device described herein, including the memory 346 for storing the user application 347 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 3, the memory 346 includes the user application 347. In some embodiments, the user application 347 includes an interface for communicating with, navigating, controlling, configuring, and/or using the user input system 340. In some embodiments, the user application 347 includes computer-executable program code portions for instructing the processor 344 to perform one or more of the functions of the user application 347 described and/or contemplated herein. In some embodiments, the user application 347 may include and/or use one or more network and/or system communication protocols.

Also shown in FIG. 3 is the user interface 349. In some embodiments, the user interface 349 includes one or more output devices, such as a display and/or speaker, for presenting information to the user. In some embodiments, the user interface 349 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 349 includes the input and display devices of a mobile device, which are operable to receive and display information.

FIG. 3 also illustrates a system 330, in accordance with an embodiment of the present invention. The system 330 may refer to the "apparatus" described herein. The system 330 may include any computerized apparatus that can be configured to perform any one or more of the functions of the system 330 described and/or contemplated herein. In accordance with some embodiments, for example, the system 330 may include a computer network, an engine, a platform, a server, a database system, a front end system, a back end system, a personal computer system, and/or the like. Therefore, the system 330 may be a server managed by the business. The system 330 may be located at the facility associated with the business or remotely from the facility associated with the business. In some embodiments, such as the one illustrated in FIG. 3, the system 330 includes a communication interface 332, a processor 334, and a memory 336, which includes a system application 337 and a structured database 338 stored therein. As shown, the communication interface 332 is operatively and selectively connected to the processor 334, which is operatively and selectively connected to the memory 336.

It will be understood that the system application 337 may be configured to implement any one or more portions of the various user interfaces and/or process flow described herein. The system application 337 may interact with the user application 347. It will also be understood that, in some embodiments, the memory includes other applications. It will also be understood that, in some embodiments, the system application 337 is configured to communicate with the structured database 338, the user input system 340, or the like.

It will be further understood that, in some embodiments, the system application 337 includes computer-executable program code portions for instructing the processor 334 to perform any one or more of the functions of the system application 337 described and/or contemplated herein. In some embodiments, the system application 337 may include and/or use one or more network and/or system communication protocols.

In addition to the system application 337, the memory 336 also includes the structured database 338. As used herein, the structured database 338 may be one or more distinct and/or remote databases. In some embodiments, the structured database 338 is not located within the system and is instead located remotely from the system. In some embodiments, the structured database 338 stores information or data described herein.

It will be understood that the structured database 338 may include any one or more storage devices, including, but not limited to, datastores, databases, and/or any of the other storage devices typically associated with a computer system. It will also be understood that the structured database 338 may store information in any known way, such as, for example, by using one or more computer codes and/or languages, alphanumeric character strings, data sets, figures, tables, charts, links, documents, and/or the like. Further, in some embodiments, the structured database 338 may include information associated with one or more applications, such as, for example, the system application 337. It will also be understood that, in some embodiments, the structured database 338 provides a substantially real-time representation of the information stored therein, so that, for example, when the processor 334 accesses the structured database 338, the information stored therein is current or substantially current.

It will be understood that the embodiment of the system environment illustrated in FIG. 3 is exemplary and that other embodiments may vary. As another example, in some embodiments, the system 330 includes more, less, or different components. As another example, in some embodiments, some or all of the portions of the system environment 300 may be combined into a single portion. Likewise, in some embodiments, some or all of the portions of the system 330 may be separated into two or more distinct portions.

In addition, the various portions of the system environment 300 may be maintained for and/or by the same or separate parties. It will also be understood that the system 330 may include and/or implement any embodiment of the present invention described and/or contemplated herein. For example, in some embodiments, the system 330 is configured to implement any one or more of the embodiments of the process flows described and/or contemplated herein in connection any process flow described herein. Additionally, the system 330 or the user input system 340 is configured to initiate presentation of any of the user interfaces described herein.

Figure 4:
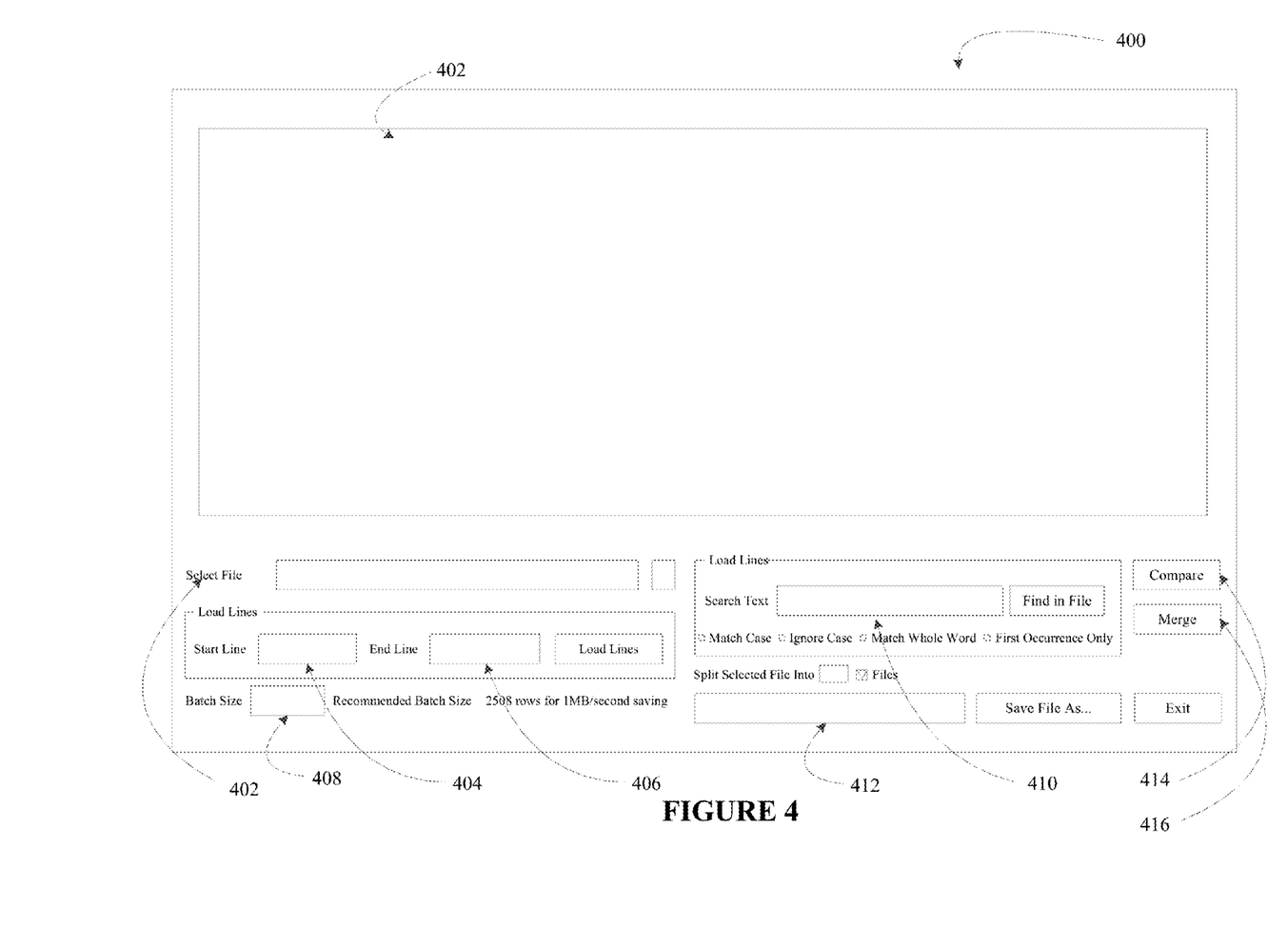
FIG. 4 presents an exemplary first user interface to enable a user to edit a large text file according to one aspect of the present invention.

FIG. 4 illustrates an exemplary first user interface 400 to enable a user to edit a large text file according to one aspect of the present invention. The first user interface 400 includes a display portion 402 to display the contents of the large text file. In some embodiments, the first user interface 400 may include an option to enable the user to select a large text file 402. The user may use the select file option 402 to choose a large text file from an external source to be processed. In another embodiment, the first user interface 400 may include an option to enable a user to enter the start line 404 and end line 406 and load the portion of the selected large text file defined by the start line 404 and the end line 406. The user may choose a portion of the large text file for processing, thereby loading only a portion of the large text file from the external source into the computer's main memory. In yet another embodiment, the first user interface 400 may include an option to enable the user to enter a batch size 408 based on at least a recommended batch size and/or a network bandwidth. As discussed earlier, a batch size may refer to a specific number of rows in the large text file capable of being processed based on the current network bandwidth.

In some embodiments, the first user interface 400 may include an option to enable the user to search for a text string 410 based on at least a letter case option such as match case, ignore case, a first occurrence only option, and a match whole word option. In one aspect, the first user interface 400 may include an option to enable the user to split the selected large text file into a number of equal parts and save each of the multiple parts individually in an external database 412. In some embodiments, the first user interface 400 may include an option to enable the user to compare contents of at least two large text files 414. In another embodiment, the first user interface 400 may include an option to enable the user to merge contents of at least two large text files 416.

Figure 5:
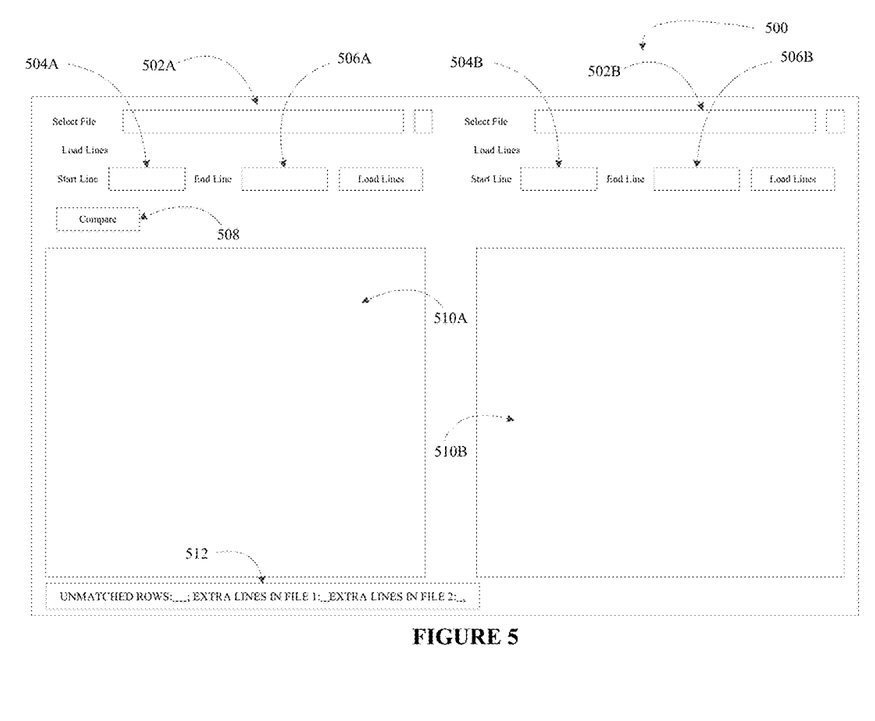
FIG. 5 presents an exemplary second user interface to enable a user to compare selected portions of two or more large text files according to one aspect of the present invention.

FIG. 5 illustrates an exemplary second user interface 500 to enable a user to compare selected portions of two or more large text files based on a user selection of the compare option 414 from the first user interface 400 according to one aspect of the present invention. In one aspect, the second user interface 500 may include an option to select a first large text file 502A and a second large text file 502B. In addition, the second user interface 500 may also include an option to enable the user to enter start lines 504A and end lines 506A to select a portion of the first large text file. In addition, the second user interface 500 may include an option to enable the user to enter start lines 504B and end lines 506B to select a portion of the second large text file. In response to selecting the portions of the first and second large text files, the system may be configured to enable the user to compare the two portions of text files using the compare option 508. In some embodiments, the second user interface 500 may include a display portion 510A and 510B for the selected first large text file and second large text file. The second user interface 500 may be configured to display the selected first large text file in the display portion 510A and display the selected second large text file in the display portion 510B. In some embodiments, the second user interface 500 may provide comparison results in the form of 512. In one aspect, the results of the comparison may include a number of unmatched rows between the selected portion of the first large text file and the selected portion of the second large text file, determining a plurality of extra lines in the selected portion of the first large text file and a plurality of extra lines in the selected portion of the second large text file. In some embodiments, determining the plurality of extra rows in the selected portion of the first large text file may include determining a difference between the plurality of rows associated with the selected portion of the first large text file and one or more determined unmatched rows. In another embodiment, determining the plurality of extra rows in the selected portion of the second large text file comprises determining a difference between the plurality of rows associated with the selected portion of second large text file and one or more determined unmatched rows.

Figure 6:
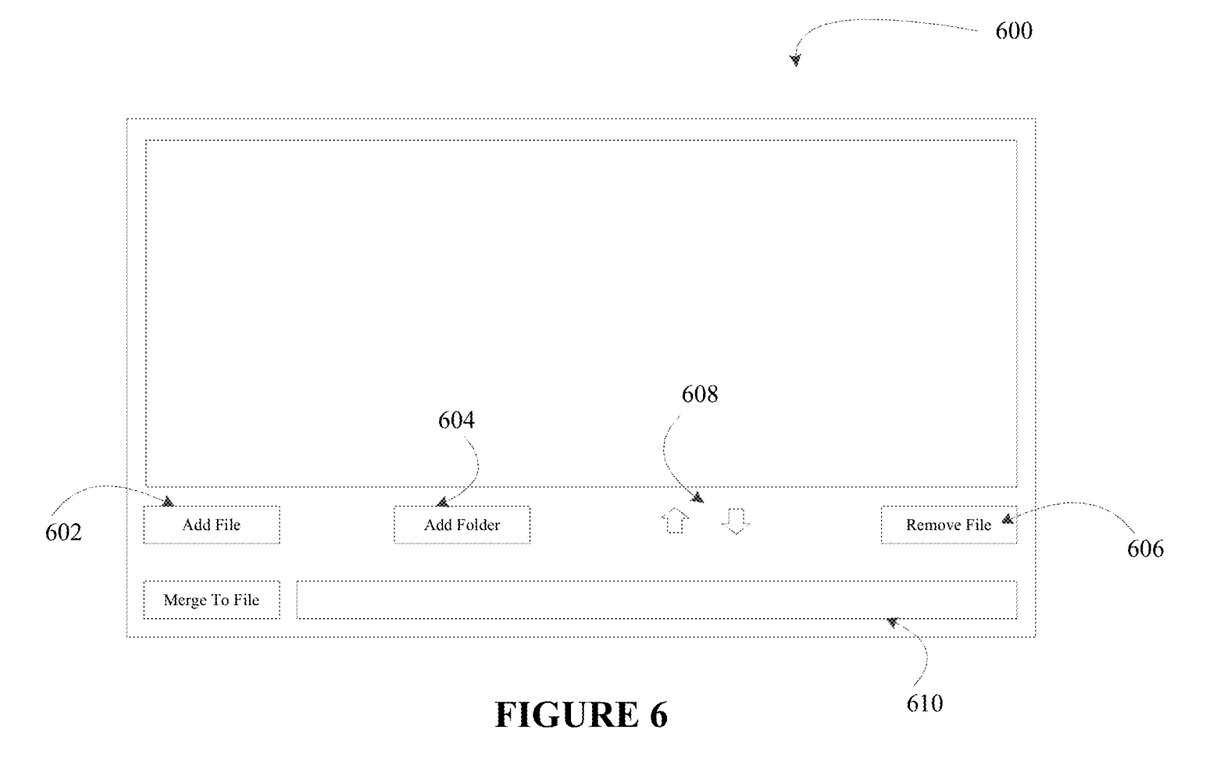
FIG. 6 presents an exemplary third user interface to enable a user to merge one or more text files according to one aspect of the present invention.

FIG. 6 illustrates an exemplary third user interface 600 to enable a user to merge one or more text files based on a user selection of the merge option 416 in the first user interface 400 according to one aspect of the present invention. In some embodiments, the third user interface 600 may include an option to enable the user to add one or more large text files 602 to be merged. In one aspect, the third user interface 600 may include an option to enable the user to add one or more folders 604 comprising one or more large text files to be merged. In another aspect, the third user interface 600 may include an option to enable the user to remove one or more files from being merged 606. In one aspect, the third user interface 600 may include an option to rearrange the order in which the one or more large text files may be merged 608. The third user interface 600 may include an option to enable the user to merge the files 610 once the user chooses one or more text files for merging.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:
1. A system to enable a user to edit a large text file, the system comprising:
   a computing platform including one or more computing processors, a memory in communication with the processor;

a module stored in a memory, executable by a processor and configured to initiate a presentation of a first user interface to:
  electronically receive a first input from a user device, wherein the first input comprises selecting a large text file from an external source, wherein the large text file is stored in plain text format, wherein the external source is one of an external database, a product of an automated software process, or a log file generated by running software applications;
  determine a start line in the large text file, where the start line is the beginning of a retrieved section of the large text file to be retrieved from the external source, wherein determining a start line in the large text file comprises:
    receiving a search string input from the user, where the search string represents a text string of interest in the large text file;
    searching the large text file using the search string to determine a first occurrence of a text string that matches the search string;
    determining a location in the large text file associated with the first occurrence of the text string that matches the search string;
    setting the start line as the location in the large text file associated with the first occurrence of the text string that matches the search string;
  determine an end line in the large text file, where the end line is the end of a retrieved section of the large text file to be retrieved from the external source, wherein determining the end line in the large text file comprises:
    automatically detecting an instant network bandwidth;
    determining a batch size based on at least the instant network bandwidth, wherein the batch size indicates a recommended number of rows associated with the large text file capable of being processed per second;
    determining the end line of the large text file based on the start line and the batch size;
  retrieve the section of the selected large text file defined by the start line and the end line from the external source, wherein retrieving further comprises loading the section of the selected large text file from the external source to a volatile memory location associated with the user device, while a remainder of the large text file is still stored in the external source;
  initiate presentation of the retrieved section of the selected large text file for display on the user device;
  receive, via the user device, a user input to modify at least a portion of the retrieved section of the selected large text file; and
  update the portion of the retrieved section of the selected large text file modified by the user on the volatile memory.

2. The system of claim 1, wherein the first user interface comprises a search field, wherein the search field enables the user to identify a match between a search string input by the user and a search string in the selected large text file based on at least one of a letter case, a first occurrence, or matching a whole word.

3. The system of claim 1, wherein the first user interface enables the user to split the selected large text file into a plurality of predetermined equal portions.

4. The system of claim 1, wherein the first user interface enables the user to merge one or more large text files.

5. The system of claim 1, wherein the module is further configured to:
  receive a user selection of a portion of a first large text file from an external source based on at least a first start line and a first end line, wherein the portion of the first large text file comprises a plurality of rows;
  receive a user selection of a portion of a second large text file from an external source based on at least a second start line and a second end line, wherein the portion of the first large text file comprises a plurality of rows; and
  compare the portion of the first large text file with the portion of the second large text file, wherein comparing further comprises comparing each of the plurality of rows associated with the portion of the first large text file with each of the plurality of rows associated with the portion of the second large text file to determine one or more unmatched rows.

6. The system of claim 5, wherein comparing further comprises determining a plurality of extra rows in the selected portion of the first large text file and a plurality of extra rows in the selected portion of the second large text file, wherein determining the plurality of extra rows in the selected portion of the first large text file comprises determining a difference between the plurality of rows associated with the selected portion of the first large text file and one or more determined unmatched rows, wherein determining the plurality of extra rows in the selected portion of the second large text file comprises determining a difference between the plurality of rows associated with the selected portion of second large text file and one or more determined unmatched rows.

7. A method to enable a user to edit a large text file, the method comprising:
  electronically receiving, using a computing device processor, a first input from a user device, wherein the first input comprises selecting a large text file from an external source, wherein the large text file is stored in plain text format, wherein the external source is one of an external database, a product of an automated software process, or a log file generated by running software applications;
  determining, using a computing device processor, a start line in the large text file, where the start line is the beginning of a retrieved section of the large text file to be retrieved from the external source, wherein determining a start line in the large text file comprises:
    receiving a search string input from the user, where the search string represents a text string of interest in the large text file;
    searching the large text file using the search string to determine a first occurrence of a text string that matches the search string;
    determining a location in the large text file associated with the first occurrence of the text string that matches the search string;
    setting the start line as the location in the large text file associated with the first occurrence of the text string that matches the search string;
  determining, using a computing device processor, an end line in the large text file, where the end line is the end of a retrieved section of the large text file to be retrieved from the external source, wherein determining the end line in the large text file comprises:
    automatically detecting an instant network bandwidth;
    determining a batch size based on at least the instant network bandwidth, wherein the batch size indicates a recommended number of rows associated with the large text file capable of being processed per second;

determining the end line of the large text file based on the start line and the batch size;

retrieving, using a computing device processor, the section of the selected large text file defined by the start line and the end line from the external source, wherein retrieving further comprises loading the section of the selected large text file from the external source to a volatile memory location associated with the user device, while a remainder of the large text file is still stored in the external source;

initiating, using a computing device processor, presentation of the retrieved section of the selected large text file for display on the user device;

receiving, using a computing device processor and via the user device, a user input to modify at least a portion of the retrieved section of the selected large text file; and updating, using a computing device processor, the portion of the retrieved section of the selected large text file modified by the user on the volatile memory.

8. The method of claim 7, wherein retrieving further comprises a search field, wherein the first user interface comprises a search field, wherein the search field enables the user to identify a match between a search string input by the user and a search string in the selected large text file based on at least one of a letter case, a first occurrence, or matching a whole word.

9. The method of claim 7, wherein the first user interface enables the user to split the selected large text file into a plurality of predetermined equal portions.

10. The method of claim 7, wherein the first user interface enables the user to merge one or more large text files.

11. The method of claim 7, wherein the method further comprises:

receiving, using a device computing processor, a user selection of a portion of a first large text file from an external source based on at least a first start line and a first end line, wherein the portion of the first large text file comprises a plurality of rows;

receiving, using a device computing processor, user selection of a portion of a second large text file from an external source based on at least a second start line and a second end line, wherein the portion of the first large text file comprises a plurality of rows; and comparing, using a device computing processor, the portion of the first large text file with the portion of the second large text file, wherein comparing further comprises comparing each of the plurality of rows associated with the portion of the first large text file with each of the plurality of rows associated with the portion of the second large text file to determine one or more unmatched rows.

12. The method of claim 11, wherein comparing further comprises determining a plurality of extra rows in the selected portion of the first large text file and a plurality of extra rows in the selected portion of the second large text file, wherein determining the plurality of extra rows in the selected portion of the first large text file comprises determining a difference between the plurality of rows associated with the selected portion of the first large text file and one or more determined unmatched rows, wherein determining the plurality of extra rows in the selected portion of the second large text file comprises determining a difference between the plurality of rows associated with the selected portion of second large text file and one or more determined unmatched rows.

13. A computer program product to enable a user to edit a large text file, the computer program product comprising a non-transitory computer-readable medium comprising code causing a first apparatus to:

electronically receive a first input from a user device, wherein the first input comprises selecting a large text file from an external source, wherein the large text file is stored in plain text format, wherein the external source is one of an external database, a product of an automated software process, or a log file generated by running software applications;

determine a start line in the large text file, where the start line is the beginning of a retrieved section of the large text file to be retrieved from the external source, wherein determining a start line in the large text file comprises:

receiving a search string input from the user, where the search string represents a text string of interest in the large text file;

searching the large text file using the search string to determine a first occurrence of a text string that matches the search string;

determining a location in the large text file associated with the first occurrence of the text string that matches the search string;

setting the start line as the location in the large text file associated with the first occurrence of the text string that matches the search string;

determine an end line in the large text file, where the end line is the end of a retrieved section of the large text file to be retrieved from the external source, wherein determining the end line in the large text file comprises:

automatically detecting an instant network bandwidth;

determining a batch size based on at least the instant network bandwidth, wherein the batch size indicates a recommended number of rows associated with the large text file capable of being processed per second;

determining the end line of the large text file based on the start line and the batch size;

retrieve the section of the selected large text file defined by the start line and the end line from the external source, wherein retrieving further comprises loading the section of the selected large text file from the external source to a volatile memory location associated with the user device, while a remainder of the large text file is still stored in the external source;

initiate presentation of the retrieved section of the selected large text file for display on the user device;

receive, via the user device, a user input to modify at least a portion of the retrieved section of the selected large text file; and update the portion of the retrieved section of the selected large text file modified by the user on the volatile memory.

14. The computer program product of claim 13, wherein the first user interface comprises a search field, wherein the first user interface comprises a search field, wherein the search field enables the user to identify a match between a search string input by the user and a search string in the selected large text file based on at least one of a letter case, a first occurrence, or matching a whole word.

15. The computer program product of claim 13, wherein the code further causes the first apparatus to:

receive a user selection of a portion of a first large text file from an external source based on at least a first start line and a first end line, wherein the portion of the first large text file comprises a plurality of rows;

receive a user selection of a portion of a second large text file from an external source based on at least a second start line and a second end line, wherein the portion of the first large text file comprises a plurality of rows; and compare the portion of the first large text file with the portion of the second large text file, wherein comparing further comprises comparing each of the plurality of rows associated with the portion of the first large text file with each of the plurality of rows associated with the portion of the second large text file to determine one or more unmatched rows.

16. The computer program product of claim 15, wherein comparing further comprises determining a plurality of extra rows in the selected portion of the first large text file and a plurality of extra rows in the selected portion of the second large text file, wherein determining the plurality of extra rows in the selected portion of the first large text file comprises determining a difference between the plurality of rows associated with the selected portion of the first large text file and one or more determined unmatched rows, wherein determining the plurality of extra rows in the selected portion of the second large text file comprises determining a difference between the plurality of rows associated with the selected portion of second large text file and one or more determined unmatched rows.

* * * * *